(12) United States Patent
Yanes et al.

(10) Patent No.: US 11,816,046 B2
(45) Date of Patent: Nov. 14, 2023

(54) INCREASED READ PERFORMANCE FOR IMPLEMENTATIONS HAVING MULTIPLE INTERFACE LINKS

(71) Applicant: International Business Machines Corporation, Armonk, NY (US)

(72) Inventors: Adalberto Guillermo Yanes, Sugar Land, TX (US); Matthew S. Reuter, Columbus, OH (US); Timothy Fisher, Cypress, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/681,472

(22) Filed: Feb. 25, 2022

(65) Prior Publication Data
US 2023/0273886 A1    Aug. 31, 2023

(51) Int. Cl.
*G06F 11/07* (2006.01)
*G06F 13/16* (2006.01)

(52) U.S. Cl.
CPC ........ *G06F 13/1673* (2013.01); *G06F 11/073* (2013.01); *G06F 11/0778* (2013.01); *G06F 13/1684* (2013.01)

(58) Field of Classification Search
CPC . G06F 11/073; G06F 11/0778; G06F 13/1673
See application file for complete search history.

(56) References Cited

U.S. PATENT DOCUMENTS 5,768,625 A * 6/1998 Muramatsu ......... H04L 49/9047
    701/1
8,279,231 B1 * 10/2012 Duncan ............... G06F 12/1081
    345/543

* cited by examiner

*Primary Examiner* — Nadeem Iqbal
(74) *Attorney, Agent, or Firm* — Zilka-Kotab, P.C.

(57) ABSTRACT

A computer-implemented method, according to one embodiment, includes: receiving, in first and second read request buffers corresponding to first and second computer interface links of a data storage system, read requests. Read completion data corresponding to the read requests being performed is also received. The read completion data is allocated between first and second read completion buffers based on which of the read completion buffers has a greater amount of available space therein. Furthermore, the read completion data in the first and second read completion buffers is sent. The first read completion buffer corresponds to the first computer interface link and the second read completion buffer corresponds to the second computer interface link.

20 Claims, 10 Drawing Sheets

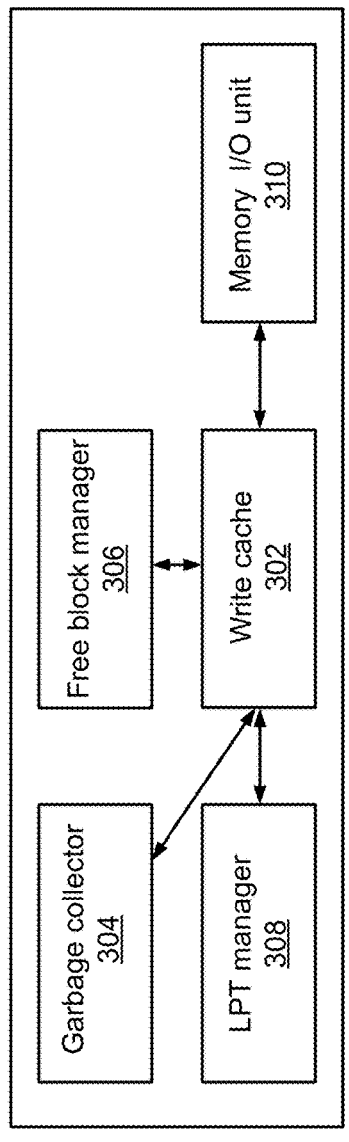
FIG. 3
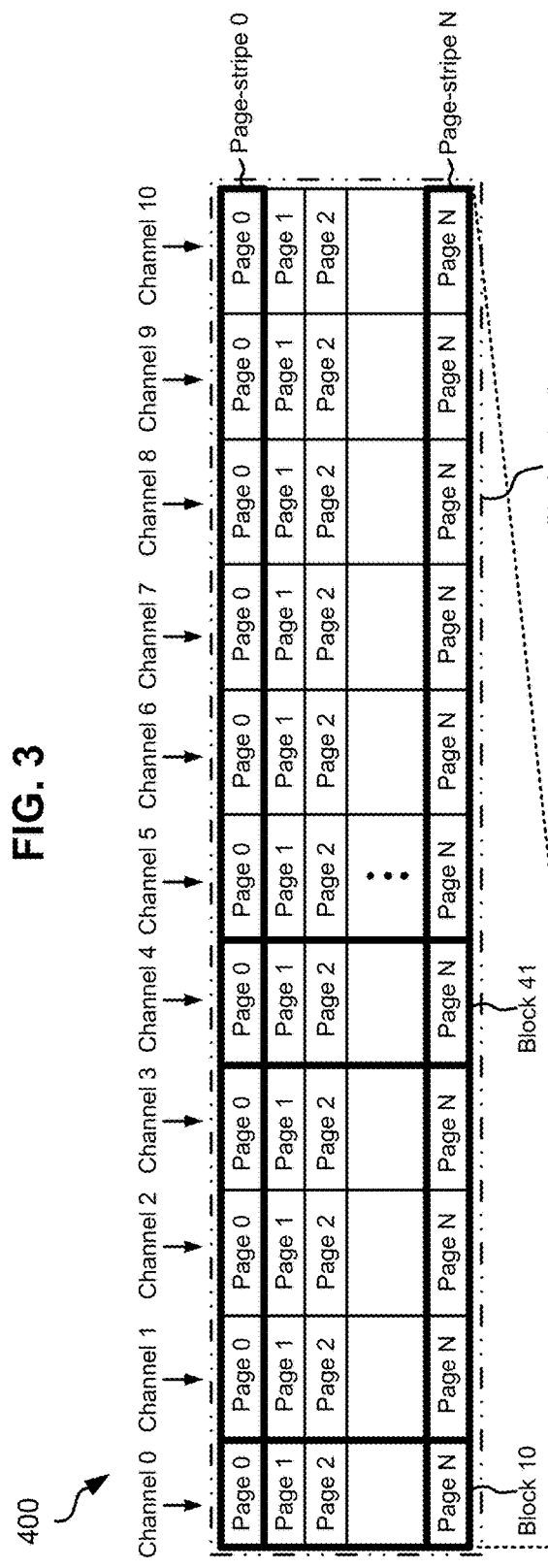
FIG. 4
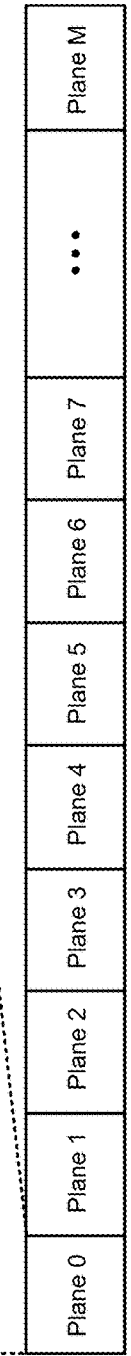

INCREASED READ PERFORMANCE FOR IMPLEMENTATIONS HAVING MULTIPLE INTERFACE LINKS

BACKGROUND

The present invention relates to data storage systems, and more particularly, this invention relates to read performance in configurations having more than one interface link.

Using Flash memory as an example, the performance characteristics of conventional NAND Flash-based solid state drives (SSDs) are fundamentally different from those of traditional hard disk drives (HDDs). Data in conventional SSDs is typically organized in pages of 4, 8, or 16 KB sizes. Moreover, page read operations in SSDs are typically one order of magnitude faster than write operations and latency neither depends on the current nor the previous location of operations.

However, in Flash-based SSDs, memory locations are erased in blocks prior to being written to. The size of an erase block unit is anywhere from 256, to 512, or even several thousands of pages and the erase operations takes approximately one order of magnitude more time than a page program operation. Due to the intrinsic properties of NAND Flash, Flash-based SSDs write data out-of-place whereby a mapping table maps logical addresses of the written data to physical ones. This mapping table is typically referred to as the Logical-to-Physical Table (LPT) which can be used to actually access data that is stored across the memory.

Data that is stored in these Flash-based SSDs may be accessed over time, e.g., using a LPT to actually locate the data in the memory. However, conventional implementations that include such Flash-based SSDs have struggled from poor read performance. These conventional implementations suffer from bottlenecks that form while attempting to satisfy read requests, thereby effectively reducing the achievable read bandwidth. It follows that a solution to this persistent degradation of read performance in conventional implementations is desired.

SUMMARY

A computer-implemented method, according to one embodiment, includes: receiving, in first and second read request buffers corresponding to first and second computer interface links of a data storage system, read requests. Read completion data corresponding to the read requests being performed is also received. The read completion data is allocated between first and second read completion buffers based on which of the read completion buffers has a greater amount of available space therein. Furthermore, the read completion data in the first and second read completion buffers is sent. The first read completion buffer corresponds to the first computer interface link and the second read completion buffer corresponds to the second computer interface link.

A computer program product, according to another embodiment, includes: one or more computer readable storage media, and program instructions collectively stored on the one or more computer readable storage media. The program instructions include: program instructions to perform the foregoing method.

A system, according to yet another embodiment, includes: a plurality of non-volatile random access memory (NVRAM) blocks configured to store data. The system also includes a processing circuit and logic integrated with and/or executable by the processing circuit, the logic being configured to: perform the foregoing method.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 3 is a system diagram, in accordance with one embodiment.

FIG. 4 is a conceptual diagram which includes a block-stripe and page-stripe, in accordance with one embodiment.

DETAILED DESCRIPTION

Figure 1:
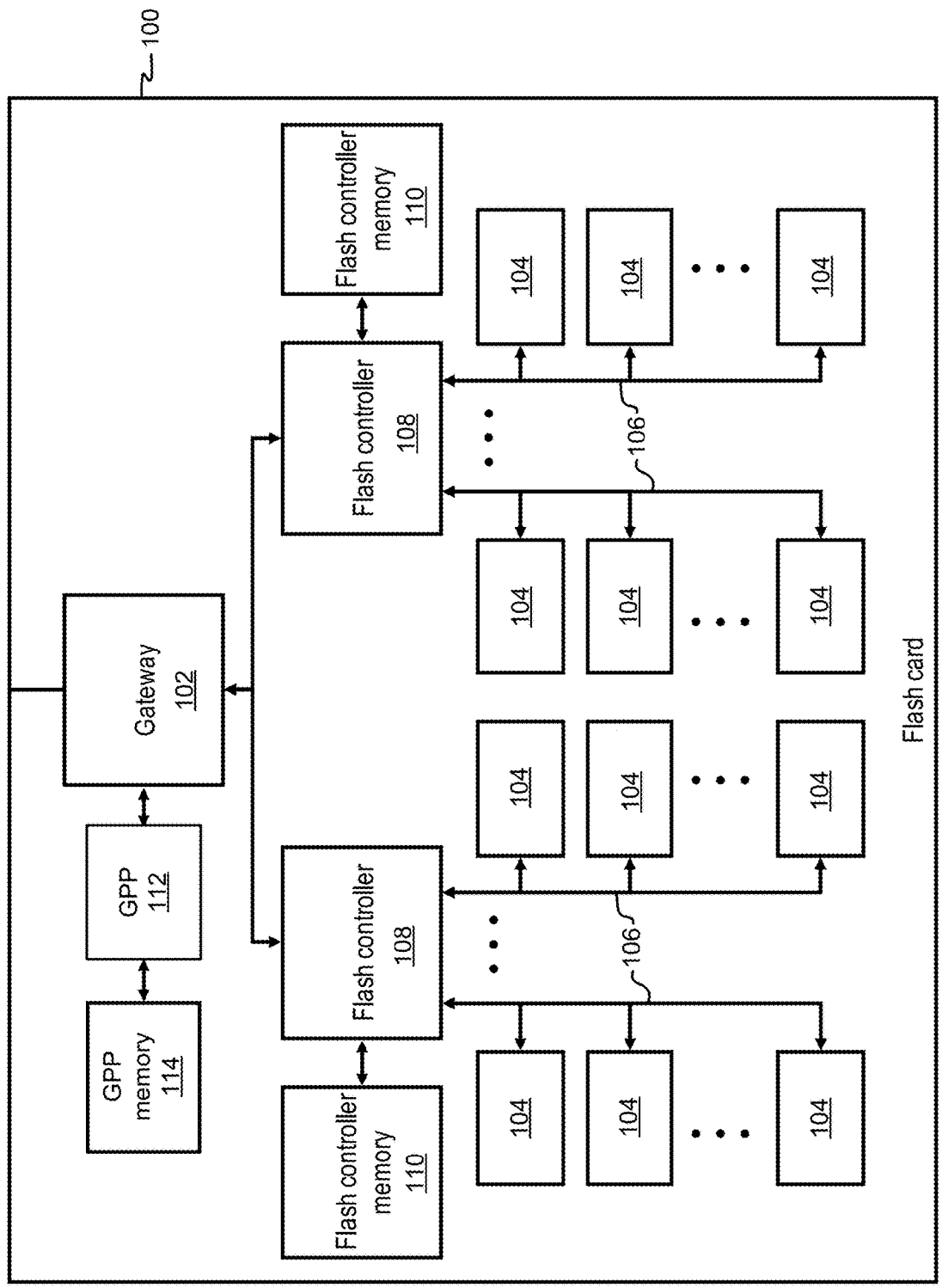
FIG. 1 is a diagram of a non-volatile memory card, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of data storage systems, as well as operation and/or component parts thereof. It should be appreciated that various embodiments herein can be implemented with a wide range of memory mediums, including for example NVRAM technologies such as NAND Flash memory, NOR Flash memory, phase-change memory (PCM), magnetoresistive RAM (MRAM) and resistive RAM (RRAM). To provide a context, and solely to assist the reader, various embodiments may be described with reference to a type of non-volatile memory. This has been done by way of example only, and should not be deemed limiting on the invention defined in the claims.

In one general embodiment, a computer-implemented method includes: receiving, in first and second read request buffers corresponding to first and second computer interface links of a data storage system, read requests. Read completion data corresponding to the read requests being performed is also received. The read completion data is allocated between first and second read completion buffers based on which of the read completion buffers has a greater amount of available space therein. Furthermore, the read completion data in the first and second read completion buffers is sent. The first read completion buffer corresponds to the first computer interface link and the second read completion buffer corresponds to the second computer interface link.

In another general embodiment, a computer program product includes: one or more computer readable storage media, and program instructions collectively stored on the one or more computer readable storage media. The program instructions include: program instructions to perform the foregoing method.

In yet another general embodiment, a system includes: a plurality of non-volatile random access memory (NVRAM) blocks configured to store data. The system also includes a processing circuit and logic integrated with and/or executable by the processing circuit, the logic being configured to: perform the foregoing method.

FIG. 1 illustrates a memory card 100, in accordance with one embodiment. It should be noted that although memory card 100 is depicted as an exemplary non-volatile data storage card in the present embodiment, various other types of non-volatile data storage cards may be used in a data storage system according to alternate embodiments. It follows that the architecture and/or components of memory card 100 are in no way intended to limit the invention, but rather have been presented as a non-limiting example.

Moreover, as an option, the present memory card 100 may be implemented in conjunction with features from any other embodiment listed herein, such as those described with reference to the other FIGS. However, such memory card 100 and others presented herein may be used in various applications and/or in permutations which may or may not be specifically described in the illustrative embodiments listed herein. Further, the memory card 100 presented herein may be used in any desired environment.

With continued reference to FIG. 1, memory card 100 includes a gateway 102, a general purpose processor (GPP) 112 (such as an ASIC, FPGA, CPU, etc.) connected to a GPP memory 114 (which may comprise RAM, ROM, battery-backed DRAM, phase-change memory PC-RAM, MRAM, STT-MRAM, etc., or a combination thereof), and a number of memory controllers 108, which include Flash controllers in the present example. Each memory controller 108 is connected to a plurality of NVRAM memory modules 104 (which may comprise NAND Flash or other non-volatile memory type(s) such as those listed above) via channels 106.

According to various embodiments, one or more of the controllers 108 may be or include one or more processors, and/or any logic for controlling any subsystem of the memory card 100. For example, the controllers 108 typically control the functions of NVRAM memory modules 104 such as, data writing, data recirculation, data reading, etc. The controllers 108 may operate using logic known in the art, as well as any logic disclosed herein, and thus may be considered as a processor for any of the descriptions of non-volatile memory included herein, in various embodiments.

Moreover, the controller 108 may be configured and/or programmable to perform or control some or all of the methodology presented herein. Thus, the controller 108 may be considered to be configured to perform various operations by way of logic programmed into one or more chips, modules, and/or blocks; software, firmware, and/or other instructions being available to one or more processors; etc., and combinations thereof.

Referring still to FIG. 1, each memory controller 108 is also connected to a controller memory 110 which preferably includes a cache which replicates a non-volatile memory structure according to the various embodiments described herein. However, depending on the desired embodiment, the controller memory 110 may be battery-backed DRAM, phase-change memory PC-RAM, MRAM, STT-MRAM, etc., or a combination thereof.

Figure 2:
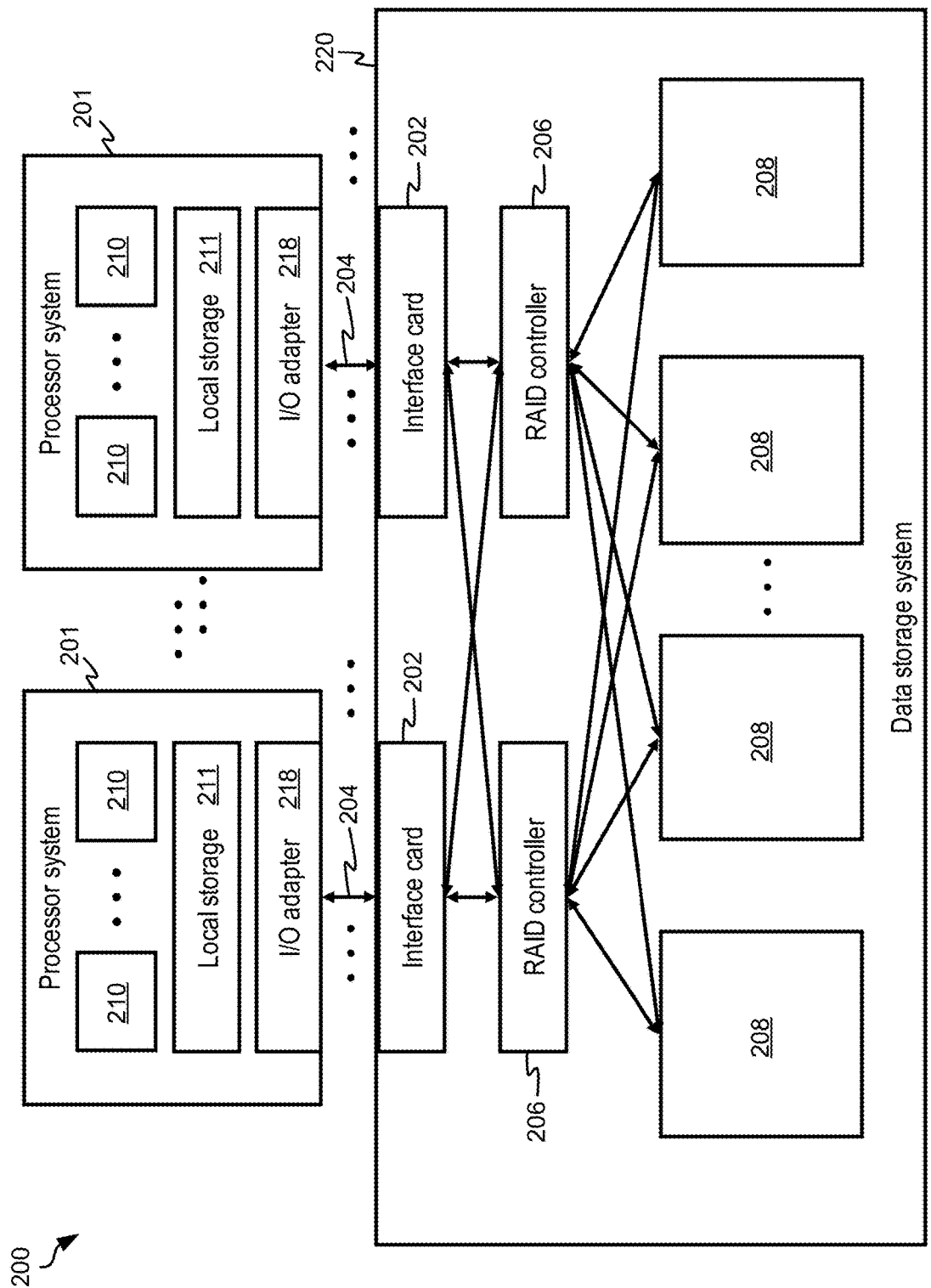
FIG. 2 is a diagram of a data storage system architecture, in accordance with one embodiment.

As previously mentioned, memory card 100 may be implemented in various types of data storage systems, depending on the desired embodiment. FIG. 2 illustrates a data storage system architecture 200 according to an exemplary embodiment which is in no way intended to limit the invention. Moreover, it should be noted that the data storage system 220 of FIG. 2 may include various components found in the embodiment of FIG. 1.

Looking to FIG. 2, the data storage system 220 comprises a number of interface cards 202 configured to communicate via I/O interconnections 204 to one or more processor systems 201. The data storage system 220 may also comprise one or more RAID controllers 206 configured to control data storage in a plurality of non-volatile data storage cards 208. The non-volatile data storage cards 208 may comprise NVRAM, Flash memory cards, RAM, ROM, and/or some other known type of non-volatile memory.

The I/O interconnections 204 may include any known communication protocols, such as Fiber Channel (FC), FC over Ethernet (FCoE), Infiniband, Internet Small Computer System Interface (iSCSI), Transport Control Protocol/Internet Protocol (TCP/IP), Peripheral Component Interconnect Express (PCIe), etc., and/or any combination thereof.

The RAID controller(s) 206 in the data storage system 220 may perform a parity scheme similar to that employed by RAID-5, RAID-10, or some other suitable parity scheme, as would be understood by one of skill in the art upon reading the present descriptions.

Each processor system 201 comprises one or more processors 210 (such as CPUs, microprocessors, etc.), local data storage 211 (e.g., such as RAM 814 of FIG. 8, ROM 816 of FIG. 8, etc.), and an I/O adapter 218 configured to communicate with the data storage system 220.

Referring again to FIG. 1, memory controllers 108, GPP 112, and/or other controllers described herein (e.g., RAID controllers 206 of FIG. 2) may be able to perform various functions on stored data, depending on the desired embodiment. Specifically, memory controllers or GPP 112 may include logic configured to perform any one or more of the following functions, which are in no way intended to be an exclusive list. In other words, depending on the desired embodiment, logic of a storage system may be configured to perform additional or alternative functions, as would be appreciated by one skilled in the art upon reading the present description.

Garbage Collection

Garbage collection in the context of SSD memory controllers of the present description may include the process of identifying blocks of data to be reclaimed for future usage and relocating all pages that are still valid therein. Moreover, depending on the specific controller and/or the respective garbage collection unit of operation, logic erase blocks (LEBs) may be identified for being reclaimed and/or relocated. Typically, one LEB corresponds to one block stripe, but alternative implementations may consider a fixed number of block stripes or a single block building a LEB as well.

A physical "block" represents a minimal unit that may be erased on non-volatile memory, e.g., such as NAND Flash memory, and thereby prepared for writing data thereto. However, a typical garbage collection unit of operation is often a multiple of the physical blocks of non-volatile memory, and is also referred to herein as a LEB. This is due to the fact that typically RAID-like parity information is added in LEBs. Therefore, in case of a page or block failure data can only be rebuilt when all blocks in the LEB are still holding data. Accordingly, the individual blocks from the garbage collection unit can only be erased either individually or in a single unit once all still valid data from all blocks in the LEB has been relocated successfully to new locations. Hence, the full garbage collection units are garbage-collected as a single unit. Moreover, the size of the LEB directly affects the garbage collection induced write amplification. The larger the LEB, the more likely it becomes that unrelated data are stored together in the LEB, and therefore more of the LEB data may have to be relocated upon garbage collection selection.

Frequently, blocks from different dies and/or flash channels are grouped together, such that blocks from the same group can be read or written in parallel, thereby increasing overall bandwidth. It is also possible to combine the previous two methods, and to compose RAID stripes using blocks from different flash channels that can be accessed in parallel.

It should also be noted that an LEB may include any multiple of the physical memory block, which is a unit of physical erasure. Moreover, the organization of memory blocks into LEBs not only allows for adding RAID-like parity protection schemes among memory blocks from different memory chips, memory planes and/or channels but also allows for significantly enhancing performance through higher parallelism. For instance, multiple non-volatile memory blocks may be grouped together in a RAID stripe. As will be appreciated by one skilled in the art upon reading the present description, RAID schemes generally improve reliability and reduce the probability of data loss.

According to an exemplary embodiment, which is in no way intended to limit the invention, memory controllers (e.g., see 108 and/or GPP 112 of FIG. 1) may internally perform a garbage collection. As previously mentioned, the garbage collection may include selecting a LEB to be relocated, after which all data that is still valid on the selected LEB may be relocated (e.g., moved). After the still valid data has been relocated, the LEB may be erased and thereafter, used for storing new data. The amount of data relocated from the garbage collected LEB determines the write amplification. Moreover, an efficient way to reduce the write amplification includes implementing heat segregation.

Heat Segregation

In the present context, the "write heat" of data refers to the rate (e.g., frequency) at which the data is updated (e.g., rewritten with new data). Memory blocks that are considered "hot" tend to have a frequent updated rate, while memory blocks that are considered "cold" have an update rate slower than hot blocks.

Tracking the write heat of a logical page may involve, for instance, allocating a certain number of bits in the LPT mapping entry for the page to keep track of how many write operations the page has seen in a certain time period or window. Typically, host write operations increase the write heat whereas internal relocation writes decrease the write heat. The actual increments and/or decrements to the write heat may be deterministic or probabilistic.

Similarly, read heat may be tracked with a certain number of additional bits in the LPT for each logical page. To reduce meta-data, read heat can also be tracked at a physical block level where separate counters per block for straddling and non-straddling reads can be maintained. However, it should be noted that the number of read requests to and/or read operations performed on a memory block may not come into play for heat segregation when determining the heat of the memory block for some embodiments. For example, if data is frequently read from a particular memory block, the high read frequency does not necessarily mean that memory block will also have a high update rate. Rather, a high frequency of read operations performed on a given memory block may denote an importance, value, etc. of the data stored in the memory block.

By grouping memory blocks of the same and/or similar write heat values, heat segregation may be achieved. In particular, heat segregating methods may group hot memory pages together in certain memory blocks while cold memory pages are grouped together in separate memory blocks. Thus, a heat segregated LEB tends to be occupied by either hot or cold data.

The merit of heat segregation is two-fold. First, performing a garbage collection process on a hot memory block will prevent triggering the relocation of cold data as well. In the absence of heat segregation, updates to hot data, which are performed frequently, also results in the undesirable relocations of all cold data collocated on the same LEB as the hot data being relocated. Therefore, the write amplification incurred by performing garbage collection is much lower for embodiments implementing heat segregation.

Secondly, the relative heat of data can be utilized for wear leveling purposes. For example, hot data may be placed in healthier (e.g., younger) memory blocks, while cold data may be placed on less healthy (e.g., older) memory blocks relative to those healthier memory blocks. Thus, the rate at which relatively older blocks are exposed to wear is effectively slowed, thereby improving the overall endurance of a given data storage system implementing heat segregation.

Write Allocation

Write allocation includes placing data of write operations into free locations of open LEBs. As soon as all pages in a LEB have been written, the LEB is closed and placed in a pool holding occupied LEBs. Typically, LEBs in the occupied pool become eligible for garbage collection. The number of open LEBs is normally limited and any LEB being closed may be replaced, either immediately or after some delay, with a fresh LEB that is being opened.

During performance, garbage collection may take place concurrently with user write operations. For example, as a user (e.g., a host) writes data to a device, the device controller may continuously perform garbage collection on LEBs with invalid data to make space for the new incoming data pages. As mentioned above, the LEBs having the garbage collection being performed thereon will often have some pages that are still valid at the time of the garbage collection operation; thus, these pages are preferably relocated (e.g., written) to a new LEB.

Again, the foregoing functions are in no way intended to limit the capabilities of any of the storage systems described and/or suggested herein. Rather, the aforementioned functions are presented by way of example, and depending on the desired embodiment, logic of a storage system may be configured to perform additional or alternative functions, as would be appreciated by one skilled in the art upon reading the present description.

Referring now to FIG. 3, a system 300 is illustrated in accordance with one embodiment. As an option, the present system 300 may be implemented in conjunction with features from any other embodiment listed herein, such as those described with reference to the other FIGS. However, such system 300 and others presented herein may be used in various applications and/or in permutations which may or may not be specifically described in the illustrative embodiments listed herein. Further, the system 300 presented herein may be used in any desired environment, e.g., in combination with a controller.

As illustrated, system 300 includes a write cache 302 which is coupled to several other components, including garbage collector 304. As previously mentioned, garbage collector 304 may be used to free LEB units by relocating valid data and providing non-volatile memory blocks to be erased for later reuse. Thus, the garbage collector 304 may reclaim blocks of consecutive physical space, depending on the desired embodiment. According to an exemplary embodiment, block erase units may be used to keep track of and/or complete the erase of non-volatile memory blocks handed over by the garbage collector 304.

Write cache 302 is also coupled to free block manager 306 which may keep track of free non-volatile memory blocks after they have been erased. Moreover, as would be appreciated by one of ordinary skill in the art upon reading the present description, the free block manager 306 may build free stripes of non-volatile memory blocks from different lanes (e.g., block-stripes) using the erased free non-volatile memory blocks.

Referring still to FIG. 3, write cache 302 is coupled to LPT manager 308 and memory I/O unit 310. The LPT manager 308 maintains the logical-to-physical mappings of logical addresses to physical pages in memory. According to an example, which is in no way intended to limit the invention, the LPT manager 308 may maintain the logical-to-physical mappings of 4KiB or 16KiB logical addresses. The memory I/O unit 310 communicates with the memory chips in order to perform low level operations, e.g., such as reading one or more non-volatile memory pages, writing a non-volatile memory page, erasing a non-volatile memory block, etc.

To better understand the distinction between block-stripes and page-stripes as used herein, FIG. 4 is a conceptual diagram 400, in accordance with one embodiment. LEBs are built from block stripes and typically a single block stripe is used to build a LEB. However, alternative embodiments may use multiple block stripes to form an LEB. As an option, the present conceptual diagram 400 may be implemented in conjunction with features from any other embodiment listed herein, such as those described with reference to the other FIGS. However, such conceptual diagram 400 and others presented herein may be used in various applications and/or in permutations which may or may not be specifically described in the illustrative embodiments listed herein. Further, the controller conceptual diagram 400 presented herein may be used in any desired environment. Thus, the exemplary non-volatile memory controller conceptual diagram 400 of FIG. 4 may be implemented in a cache architecture. However, depending on the desired embodiment, the conceptual diagram 400 of FIG. 4 may be implemented in defining the organization of data stored in non-volatile memory. Accordingly, both implementations are described in turn below.

Non-Volatile Memory

Looking now to FIG. 4, the conceptual diagram 400 includes a set of M+1 aggregated planes labeled "Plane 0" through "Plane M". An aggregated plane consists of all physical planes with the same plane index on different channels. It should be noted that aggregated planes are also referred to herein simply as planes.

When implemented with data stored in non-volatile memory, each physical plane on a channel may include a large set of blocks, e.g., typically in the order of 1024, 2048 or more. Moreover, one or more physical planes may also include several additional blocks which may be used as replacement blocks for bad blocks (e.g., blocks performing poorly, blocks having undesirable characteristics, etc.).

In each plane of non-volatile memory, a single block from each channel may form a respective block-stripe. It follows that a number of block-stripes supported by a given embodiment of non-volatile memory may be determined by the number of blocks per plane and the number of planes.

In the exploded view of Plane 0, the conceptual diagram 400 further illustrates a single block-stripe (Block-stripe 0) out of the set of block-stripes supported in the remainder of the planes. Block-stripe 0 of plane 0 is shown as including 11 blocks, one block from each channel labeled "Channel 0" through "Channel 10". It should be noted that the association of blocks to block-stripe can change over time as block-stripes are typically dissolved after they have been garbage collected. Erased blocks may be placed in free block pools, whereby new block-stripes are assembled from blocks in the free block pools when write allocation requests fresh block-stripes. For example, looking to conceptual diagram 400, Block 10 from Channel 0 and Block 41 from Channel 4 are currently associated with the illustrated Block-stripe 0 of Plane 0. Furthermore, the illustrated Block-stripe 0 holds N+1 page-stripes and each block therefore holds N+1 pages labeled "Page 0" through "Page N".

Cache Architecture

Referring still to FIG. 4, each block of pages illustrated in the exploded view of aggregated Plane 0 may constitute a unique block from one channel when implemented in a cache architecture. Similarly, each channel contributes a single, individual block which form a block-stripe. For example, looking to conceptual diagram 400, Block 10 from Channel 0 includes all pages (Page 0 through Page N) therein, while Block 41 from Channel 4 corresponds to all pages therein, and so on.

In the context of a memory controller, e.g., which may be capable of implementing RAID at the channel level, a block-stripe is made up of multiple blocks which amount to a stripe of blocks. Looking still to FIG. 4, the multiple blocks of aggregated Plane 0 constitute Block-stripe 0. While all blocks in a block-stripe typically belong to the same aggregated plane, in some embodiments one or more blocks of a block-stripe may belong to different physical planes. It follows that each aggregated plane may include one or more block-stripe. Thus, according to an illustrative embodiment, Block 0 through Block 10 from different physical planes may constitute a block-stripe.

Regardless of whether the conceptual diagram 400 of FIG. 4 is implemented with non-volatile memory and/or a cache architecture, in different embodiments, the number of pages in each block and/or the number of channels in each plane may vary depending on the desired embodiment. According to an exemplary embodiment, which is in no way intended to limit the invention, a block may include 256 pages, but could include more or fewer in various embodiments. Analogously, the number of channels per plane and/or the number of planes may vary depending on the desired embodiment.

Referring still to FIG. 4, all pages in a block-stripe with the same page index denote a page-stripe. For example, Page-stripe 0 includes the first page (Page 0) of each channel in Block-stripe 0 of Plane 0. Similarly, Page-stripe N includes the last page (Page N) of each channel in Block-stripe 0 of Plane 0.

As previously mentioned, data that is stored in Flash-based SSDs may be accessed over time, e.g., using a LPT to actually locate the data in the memory. However, conventional implementations that include such Flash-based SSDs have struggled from poor read performance while attempting to satisfy read operations. These conventional implementations suffer from bottlenecks that form while attempting to satisfy read requests, thereby effectively reducing the achievable read bandwidth. It follows that a solution to this persistent degradation of read performance in conventional implementations is desired.

In sharp contrast to the conventional shortcomings mentioned above, some of the approaches included herein improve read performance by increasing the number of communication links that are able to provide (e.g., return) requested data read from memory. While increasing the number of communication links does improve the achievable read bandwidth, it also complicates the data return path. For instance, each of the communication links may process data at different rates based on network traffic, operation size, data type, data storage location, requesting location, etc. The process of ensuring each communication link is being utilized concurrently thereby impacts read performance, e.g., as will be described in further detail below.

Figure 5:
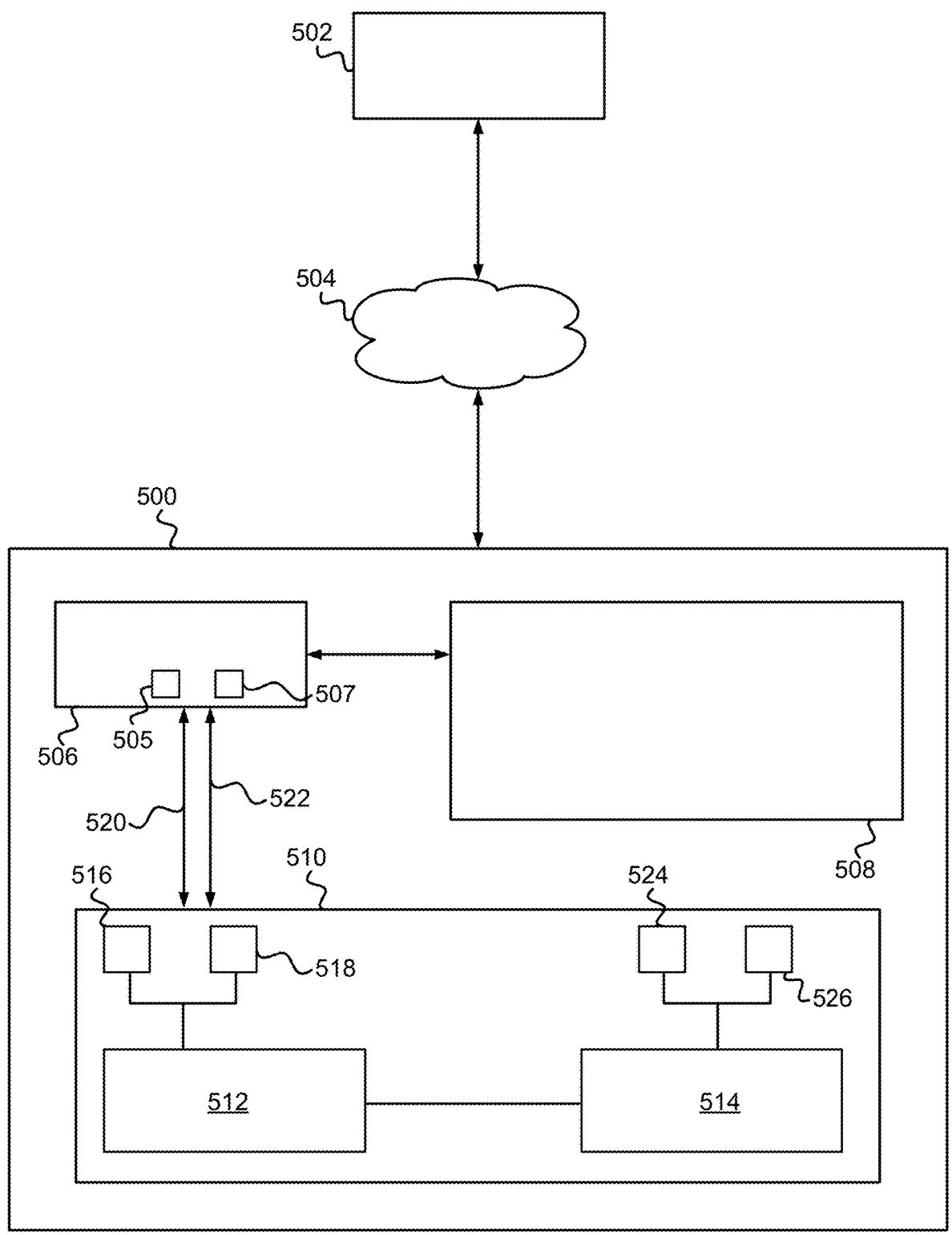
FIG. 5 is a partial representational view of a data storage system, in accordance with one embodiment.

Referring now to FIG. 5, a representational view of a data storage system 500 is depicted in accordance with one embodiment. As an option, the present data storage system 500 may be implemented in conjunction with features from any other embodiment listed herein, such as those described with reference to the other FIGS. However, such data storage system 500 and others presented herein may be used in various applications and/or in permutations which may or may not be specifically described in the illustrative embodiments listed herein. Further, the data storage system 500 presented herein may be used in any desired environment. Thus FIG. 5 (and the other FIGS.) may be deemed to include any possible permutation.

As shown, the data storage system 500 is connected to a host 502 over a network 504. It follows that requests, data, information (e.g., metadata), commands, etc., may be sent between the data storage system 500 and host 502 over the network 504. However, it should be noted that the specific configuration depicted in FIG. 5 is in no way intended to be limiting. For instance, although only one host 502 is illustrated as being connected to the data storage system 500, in other approaches any number of hosts, remote systems, networks, etc. may be connected thereto.

It should also be noted that network 504 may be of any type, e.g., depending on the desired approach. For instance, in some approaches the network 504 is a WAN, e.g., such as the Internet. However, an illustrative list of other network types which network 504 may implement includes, but is not limited to, a LAN, a PSTN, a SAN, an internal telephone network, etc. Accordingly, the data storage system 500 and the host 502 are able to communicate with each other regardless of the amount of separation which exists therebetween, e.g., despite being positioned at different geographical locations.

Looking to the data storage system 500, a controller 506 is connected to system memory 508 as well as a solid state drive (SSD) 510. The system memory 508 may include any desired type of memory, e.g., depending on the desired approach. It follows that the system memory 508 may be configured differently depending on desired functionality, the type of data storage system, industry standards, etc.

The SSD 510 further includes a memory module 512 and a compressor 514. In preferred approaches, the memory module 512 includes RAM, e.g., non-volatile random access memory (NVRAM) technologies such as NAND Flash memory, NOR Flash memory, etc. It follows that in some approaches, the SSD 510 may be a Flash based SSD, e.g., as would be appreciated by one skilled in the art after reading the present description. The memory module 512 may thereby store data that can be accessed using the compressor 514. For instance, data that is read from the memory module 512 is sent to the compressor 514 for compression before the data can be used. The throughput of the SSD 510 is thereby at least somewhat dependent on the rate at which data can be sent, e.g., such as between the memory module 512 and compressor 514.

In an effort to increase data throughput and thereby improve performance of the data storage system 500 as a whole, multiple computer interface links are used to receive information at, and send information from, the SSD 510. In other words, the first and second computer interface links 520, 522 are connected to the same SSD 510. While the configuration depicted in FIG. 5 is in no way intended to be limiting, the SSD 510 receives and sends information along a first computer interface link 520 and a second computer interface link 522. The pair of computer interface links are able to send and/or receive information simultaneously, thereby significantly increasing throughput of the SSD 510. It should be noted that the information that is received at and sent from the SSD 510 may vary depending on the approach. For instance, in some approaches the SSD 510 may receive read requests for data stored therein, and the read requests may be satisfied by sending the requested data (also referred to herein as "read completion data") in return. Other approaches however may involve receiving write requests and returning confirmation messages, or any other types of information.

Buffers 505, 507 at the controller 506 may be used to accumulate read requests that are ultimately sent to the SSD 510 along the computer interface links 520, 522. This backlog of read requests desirably allows for read requests to be sent along the computer interface links 520, 522 in a selective manner which improves system performance. For instance, by sending read requests along the computer interface links 520, 522 to the SSD 510 in an alternating manner, read completion data may be returned from the SSD 510 in a more uniform and consistent flow than previously achievable. For instance, by sending a read request sent along computer interface link 520 after sending a read request along computer interface link 522 and vice versa, backlogs are avoided.

Information (e.g., read requests) received by the SSD 510 may be stored in one of the first and second read request buffers 516, 518. In some approaches, the intended read request buffer for a given read request may be gleaned from the communication interface link the read request was actually received on. According to an example, a read request received along the first computer interface link 520 may be stored in the first read request buffer 516, while a read request received along the second computer interface link 522 may be stored in the second read request buffer 518.

However, it should be noted that while each of the first and second read request buffers 516, 518 may correspond to a respective one of the first and second computer interface links 520, 522, the buffers 516, 518 may actually store information received along either of the two links in some approaches. In other words, information such as Flash read requests that are received along the first computer interface link 520 may be stored in the first read request buffer 516 or the second read request buffer 518. Keeping the two read request buffers 516, 518 at a similar fill level may further contribute to maintaining high data throughput. In other words, performance of the data storage system 500 benefits from ensuring the two read request buffers 516, 518 have a similar amount of available space therein. However, this balancing of the read request buffer 516, 518 fill levels may be accomplished differently depending on the particular approach.

For instance, in some approaches, the information (e.g., read requests) received at the SSD 510 may actually indicate which of the read request buffers 516, 518 the information should be submitted to. The source of read requests received at the SSD 510 may thereby be indicated by one or more flags, metadata headers, bits, etc., associated with the received information. According to an example, Flash read requests may be received from controller 506, each of the Flash read requests indicating the computer interface link they were received along. The read requests may be received along the computer interface links at the first and second read request buffers 516, 518 in an alternating pattern such that the buffers may be filled in a uniform manner. In some approaches however, status information associated with the fill levels of the read request buffers 516, 518 may actually be sent back for determining whether the buffers are being filled at a relatively similar rate, and adjusting the rate at which requests are sent along the computer interface links.

In still other approaches which are in no way intended to limit the invention, the information (e.g., read requests) received at the SSD 510 may not indicate which of the read request buffers 516, 518 the information should be submitted to at all. Rather, processing circuitry in the SSD 510 may actually determine which of the first and second read request buffers 516, 518 received information should be assigned to. According to an example, Flash read requests may be received and a current amount of available space in each of the read request buffers 516, 518 examined dynamically. Each of the read requests can thereby be assigned to the one of the read request buffers 516, 518 determined as having a greater amount of available space therein.

Read requests stored in the read request buffers 516, 518 are processed over time, thereby creating more room for additional requests that are received along the multiple computer interface links. As noted above, while increasing the number of communication links does improve the achievable read bandwidth, it also complicates the data return path. For instance, each of the links may process data at different rates based on network traffic, operation size, data type, data storage location, requesting location, etc. The source of the read requests that are received may even have an effect on the latency that is experienced.

For example, read requests for a logical page that has not yet been allocated (or "zero page data") has a low amount of latency (e.g., in a range from about 1 to about 9 microseconds), compared to read requests involving write cache data, or data that has not yet been written. While read requests involving write cache data typically involve tens of microseconds to perform, these requests are satisfied much more quickly than data that has been written to memory (or Flash data in Flash-based SSDs) which typically take from about 50 to about 150 microseconds. Approaches which are able to ensure the different computer interface links are utilized concurrently, thereby improving read performance are be described in further detail below.

These read requests may be processed by accessing the requested data in the memory module 512, and passing the requested data on to the compressor 514. The compressor 514 in turn may be used to perform additional processing on the accessed data, e.g., such as data compression. The compressor 514 is thereby used in some approaches to effectively compile the read completion data that is used to satisfy a read request. The memory module 512 and compressor 514 may thereby be utilized together in order to actually satisfy read requests.

From the compressor 514, read completion data is sent to read completion buffers 524, 526 which store the read completion data before it is sent from the SSD 510 along the computer interface links 520, 522. While information received at and sent from the memory module 512 may travel along one of the two computer interface links 520, 522 and may be stored at least temporarily in one of the buffers in each pair 516, 518 and 524, 526, the flow of information in the SSD 510 is more restricted. For instance, the pathways connecting the memory module 512 and compressor 514 have a lower throughput than a combined throughput the two computer interface links 520, 522 are able to achieve. It follows that in order to maintain improved performance for the system 500, it is preferred that the SSD 510 does not experience any idle periods while one or more requests remain outstanding. Ensuring both buffers in each of the pairs have a similar amount of available space therein (e.g., have a similar fill level) helps avoid such downtimes and maintain high throughput of the system, e.g., as will be described in further detail below.

Figure 6A:
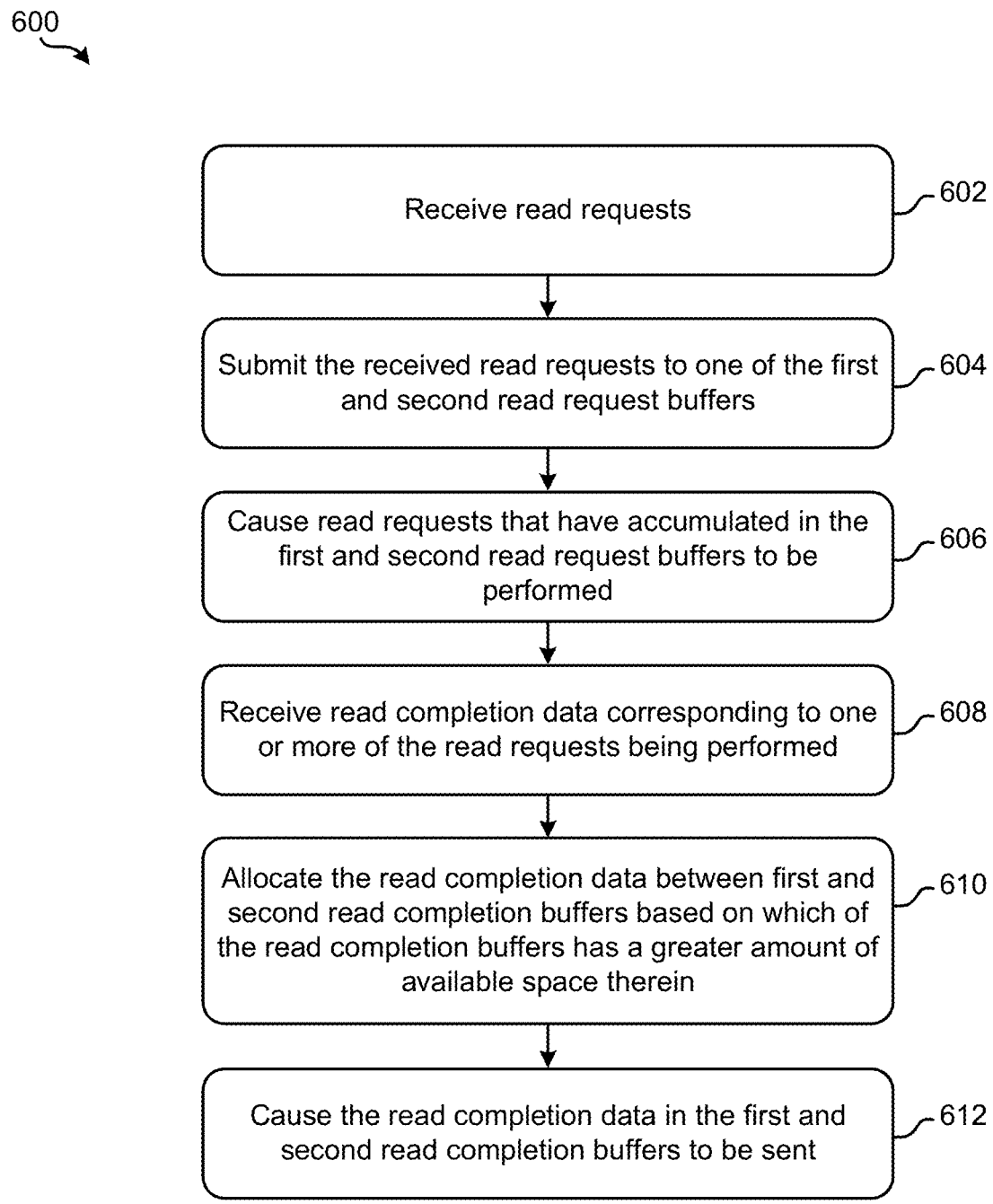
FIG. 6A is a flowchart of a method, in accordance with one embodiment.

Looking now to FIG. 6A, a method 600 for satisfying received read requests is shown according to one embodiment. The method 600 may be performed in accordance with the present invention in any of the environments depicted in FIGS. 1-5, among others, in various embodiments. Of course, more or less operations than those specifically described in FIG. 6A may be included in method 600, as would be understood by one of skill in the art upon reading the present descriptions.

Each of the steps of the method 600 may be performed by any suitable component of the operating environment. For example, in various embodiments, the method 600 may be partially or entirely performed by a controller, a processor, a computer, etc., or some other device having one or more processors therein. According to examples, which are in no way intended to limit the invention, one or more of the processes included in method 600 may be performed by a central storage controller (e.g., see 506 of FIG. 5), a local controller in an SSD module (e.g., see 512 of FIG. 5), etc. Thus, in some embodiments, method 600 may be a computer-implemented method. Moreover, the terms computer, processor and controller may be used interchangeably with regards to any of the embodiments herein, such components being considered equivalents in the many various permutations of the present invention.

Moreover, for those embodiments having a processor, the processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a central processing unit (CPU), an application specific integrated circuit (ASIC), a field programmable gate array (FPGA), etc., combinations thereof, or any other suitable computing device known in the art.

It should also be noted that the processes included in method 600 have been described in the context of read requests, this is in no way intended to be limiting. Additional types of requests may be received and satisfied using the same, similar, or different processes than those described in the context of FIG. 6A, e.g., as would be appreciated by one skilled in the art after reading the present description. Furthermore, the type of read request that is received is in no way intended to be limiting. For instance, in some approaches the read requests that are received are Flash read requests, but other types of read requests may be received, e.g., depending on where the requests are received from, the type of memory in which the requested data is stored, etc.

Accordingly, operation 602 of method 600 includes receiving read requests. As noted above, the read requests may be of a particular type (e.g., Flash read requests) and may be received from a number of different locations. In some approaches, the read requests may be received from one or more Hosts (e.g., see 502 of FIG. 5), but in other approaches the read requests may be received from running applications, other storage systems, etc.

The read requests identify the data that is being requested and may include additional information such as the requesting location, read type, importance of the data being requested, etc. In some approaches, this additional information includes indicators which are used to identify which computer interface link each of the read requests were received along. This indicator thereby indicates which of the computer interface link each read request is associated with, thereby improving the interleaving of read requests as they are received as well as the return of read completion data, e.g., as will be described in further detail below. As noted above, performance efficiency is negatively affected when some read buffers are empty while others have a number of read requests stored therein. Thus, by alternating the buffer each subsequent read request is assigned to by alternating the communication interface link used to deliver each subsequent read request, some of the approaches herein are able to achieve a consistent flow of requests and data across the interface links. Moreover, implementing an indicator in the form of one or more flags, bits, metadata headers, etc. that is able to retain this interface link information may further improve performance.

Some read requests may actually be received with an indication of the amount of data that is associated with satisfying the requests. The amount of data provides some insight as to how much read completion data will ultimately be added to one of the read completion buffers, and therefore may be used to further balance the fill levels of the read request buffers as well as the read completion buffers. This indication of the amount of data that is associated with satisfying the request may thereby be utilized to further improve performance downstream.

In some approaches the read requests may be sent along the computer interface links in a repeating pattern that alternates between the interface links in a sequential manner, such that one read request is sent along one of the interface links and the next read request is sent along the other interface link before repeating the process. In other approaches, read requests may be received along the computer interface links in a random order, based on temporal factors, depending on user input, etc. In still other approaches, information regarding the relative fill level of each read buffer may actually be sent periodically such that the read requests may be set in an order that is able to adapt to changing fill levels in the read buffers dynamically. A determination as to a difference in the fill levels of the different buffers may even be made in some instances, such that selective placement of read requests in the buffers may be initiated in situations where the buffers are determined to have become undesirably unbalanced. Yet in situations where the buffers are determined as having fill levels that are desirably close to each other, a predetermined read request assignment scheme may be resumed, e.g., where read requests are received along the computer interface links in an iterative and sequential manner.

While the read requests may themselves indicate which of the computer interface links the requests correspond to, in other approaches the decision as to which read buffer a given read request should be assigned may be determined after the read request is received. Referring back momentarily to FIG. 5, a read request received at the SSD 510 may be assigned to one of the read request buffers 516, 518 based on their relative fill levels. For example, in response to receiving a read request, a processor in the SSD 510 may determine which of the first and second read request buffers 516, 518 have a greater amount of available space therein. The received read request may thereby be assigned to the one of the read request buffers 516, 518 determined as having a greater amount of available space, thereby desirably keeping the fill levels of the read request buffers 516, 518 substantially similar.

Referring back to FIG. 6A, it should also be noted that the read requests received in operation 602 may be received along more than one different computer interface link. As noted above, by increasing the number of computer interface links that connect two different locations in a system, the amount of information (e.g., requests, data, commands, etc.) that may be sent between the locations simultaneously and in parallel increases significantly. According to an exemplary approach, which is in no way intended to limit the invention, the read requests are received along two different PCIe links. Moreover, these PCIe links may each correspond to one of the read request buffers and read completion buffers. In other words, a first read request buffer and first read completion buffer may correspond to a first PCIe link, while a second read request buffer and second read completion buffer correspond to a second PCIe link. However, any type of computer interface link(s) that would be apparent to one skilled in the art after reading the present description may be used in combination with, or in place of the PCIe links in the aforementioned approach.

The received read requests are submitted to one of the first and second read request buffers. See operation 604. As noted above, the manner in which read requests are assigned to the read request buffers may differ depending on the particular approach, but in some approaches, this process of submitting the read requests to the buffers may be based on the computer interface link which the requests were received. As noted above, these indicators may actually maintain this information for future use.

Some read requests may even be received with an indication of the amount of data that is associated with satisfying the requests. The amount of data provides some insight as to how much read completion data will ultimately be added to one of the read completion buffers, and therefore may be used to further balance the fill levels of the read request buffers as well as the read completion buffers. This indication of the amount of data that is associated with satisfying the request may thereby be utilized to further improve performance downstream.

Moreover, operation 606 includes causing read requests that have accumulated in the first and second read request buffers to be performed. In some approaches, this may be achieved by sending one or more instructions (e.g., to memory) that result in the data corresponding to each of the read requests being extracted (e.g., copied) from memory. However, as noted above, the process of actually extracting data from memory to satisfy a read request is a lower throughput activity in comparison to the read requests that are being received. This is caused, at least in part, by the different types of paths the requests and data travel along. Looking again momentarily to FIG. 5, it is noted that the dual computer interface links 520, 522 are capable of achieving a higher throughput than the more restrictive flow of information in the SSD 510. A difference in achievable throughput has resulted in bottlenecks and undesirable performance metrics for conventional systems. In sharp contrast, various ones of the approaches included herein are able to maintain substantially similar fill levels in the different pairs of buffers.

By selectively performing the read requests that are stored in the read request buffers, method 600 may be able to adapt even to situations where the inflow of read requests is unable to maintain a similar amount of available space in each of the read request buffers. For instance, the relative fill level of each read request buffer may be monitored and used to determine which of the outstanding read requests should be performed at a particular point in time. In situations where a read request buffer has become fuller than the other read request buffers, this selective performance allows for a read request in the fuller read buffer to be performed, thereby providing directed relief to the buffer. It follows that the process of causing read requests that have accumulated in the first and second read request buffers to be performed may involve actually determining the relative fill levels of the read request buffers, identifying a read request buffer having a least amount of available space therein, and selecting a read request (e.g., an oldest read request) in the identified read buffer to be performed.

This selective performance of requests in the read request buffers may also be based on the fill levels of buffers downstream. For instance, the relative fill levels of the read completion buffers may be taken into consideration when selecting which read request from which read request buffer is performed at a given time. Any differences between the fill levels in the read completion buffers may be counteracted by selecting an outstanding read request from a read request buffer associated with the computer interface link that is correlated with the read completion buffer having the lesser amount of available space therein.

A discrepancy in the fill levels of the buffers may thereby be counteracted by causing a newer read request in one of the read request buffers to be satisfied prior to an older read request in the other of the read request buffers that is still outstanding. It follows that the order in which read requests are received may not ultimately dictate the order in which the requests are actually satisfied. Again, the requests may be performed in a different order to overcome temporary imbalances in the flow of the requests.

Figure 6B:
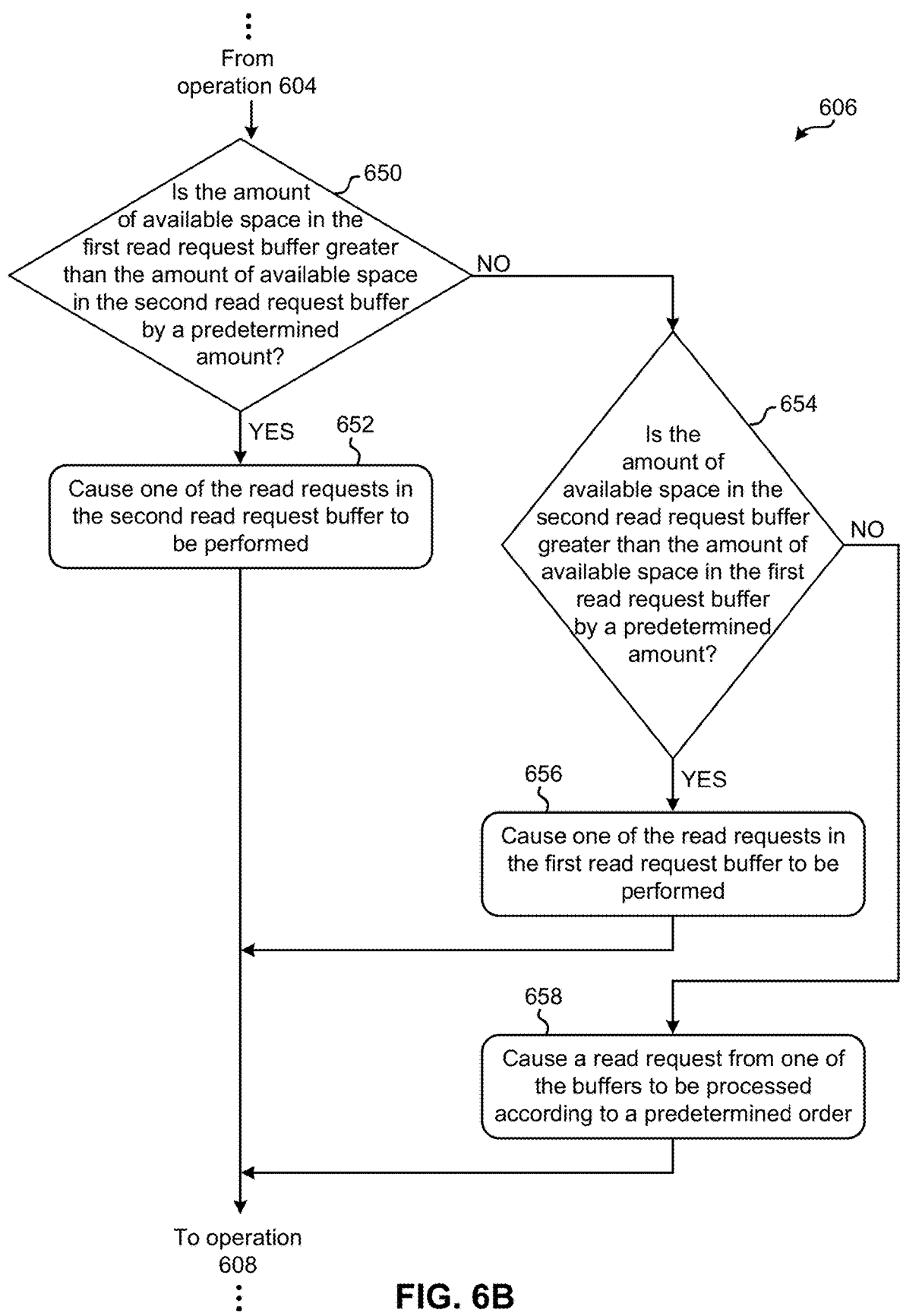
FIG. 6B is a flowchart of sub-processes for one of the operations in the method of FIG. 6A, in accordance with one embodiment.

Referring momentarily now to FIG. 6B, exemplary sub-processes involved with causing read requests that have accumulated in the first and second read request buffers to be performed are illustrated in accordance with another embodiment which is in no way intended to be limiting. It follows that one or more of these sub-processes may be used to perform operation 606 of FIG. 6A. However, it should be noted that the sub-processes of FIG. 6B are illustrated in accordance with one embodiment which is in no way intended to limit the invention.

As shown, a determination is made as to whether an amount of available space in the first read request buffer is greater than an amount of available space in the second read request buffer by a predetermined amount. See decision 650. In other words, decision 650 includes determining whether the fill levels of the first and second read request buffers differ by more than a desired amount. This predetermined amount may be set by a user, calculated based on a predetermined formula, based on past performance, etc.

In response to determining that the amount of available space in the first read request buffer is greater than the amount of available space in the second read request buffer by the predetermined amount, the flowchart proceeds to sub-operation 652. There, sub-operation 652 includes causing one of the read requests in the second read request buffer to be performed.

However, in response to determining that the amount of available space in the first read request buffer is not greater than the amount of available space in the second read request buffer by the predetermined amount, the flowchart proceeds to decision 654. There, decision 654 includes determining whether the amount of available space in the second read request buffer is greater than the amount of available space in the first read request buffer by the predetermined amount. In other words, after determining that the first read request buffer is not overfilled, a determination may be made as to whether the second read request buffer is overfilled.

Accordingly, in response to determining that the amount of available space in the second read request buffer is greater than the amount of available space in the first read request buffer by the predetermined amount, sub-operation 656 includes causing one of the read requests in the first read request buffer to be performed. It should also be noted that the size (e.g., storage capacity) of the various buffers referenced herein is preferably great enough to store a sufficient number of read requests or amount of read completion data to ensure the transfer of information is not interrupted. Again, performance of the system is significantly improved by maintaining a consistent flow of information across the computer interface links, regardless of the rate, size, type, etc. of requests are received.

It follows that decisions 650 and 654 contribute towards ensuring that the read request buffers remain at similar fill levels, thereby maintaining improved performance of the system. Accordingly, a first read request received earlier than a second read request may be postponed as a result of shifting buffer fill levels and actually be satisfied later than the second read request. However, in situations where it is determined that neither of the read request buffers are undesirably full compared to the other, sub-operation 658 includes causing a read request from one of the buffers according to be processed according to a predetermined order. In other words, sub-operation 658 includes reverting back to a predetermined order in which the requests in the different buffers are satisfied. For example, read requests in the two buffers may be processed in an alternating and iterative fashion, e.g., as would be appreciated by one skilled in the art after reading the present description.

Returning once again to FIG. 6A, operation 608 includes receiving read completion data corresponding to one or more of the read requests being performed. As noted above, data that is accessed from memory may be processed before the data may actually be used to satisfy the read request. For example, data read from memory may be processed by a compressor before being returned in an effort to satisfy the read request. It follows that the read completion data received in operation 608 may have been processed (e.g., modified) in any desired manner since having been read from memory.

The read completion data is further allocated between first and second read completion buffers based on which of the read completion buffers has a greater amount of available space therein. See operation 610. Similar to the read request buffers, system performance benefits from maintaining similar fill levels in the read completion buffers. Accordingly, by assigning the read completion data based on the relative fill levels of the read completion buffers, improved performance is maintained. While the actual fill levels of the read completion buffers may be inspected each time read completion data is received, periodically over time, in response to a predetermined condition being met, etc., the amount of available space in each of the buffers may be determined differently. For instance, a credit system may be utilized to keep track of the relative buffer fill levels.

Figure 6C:
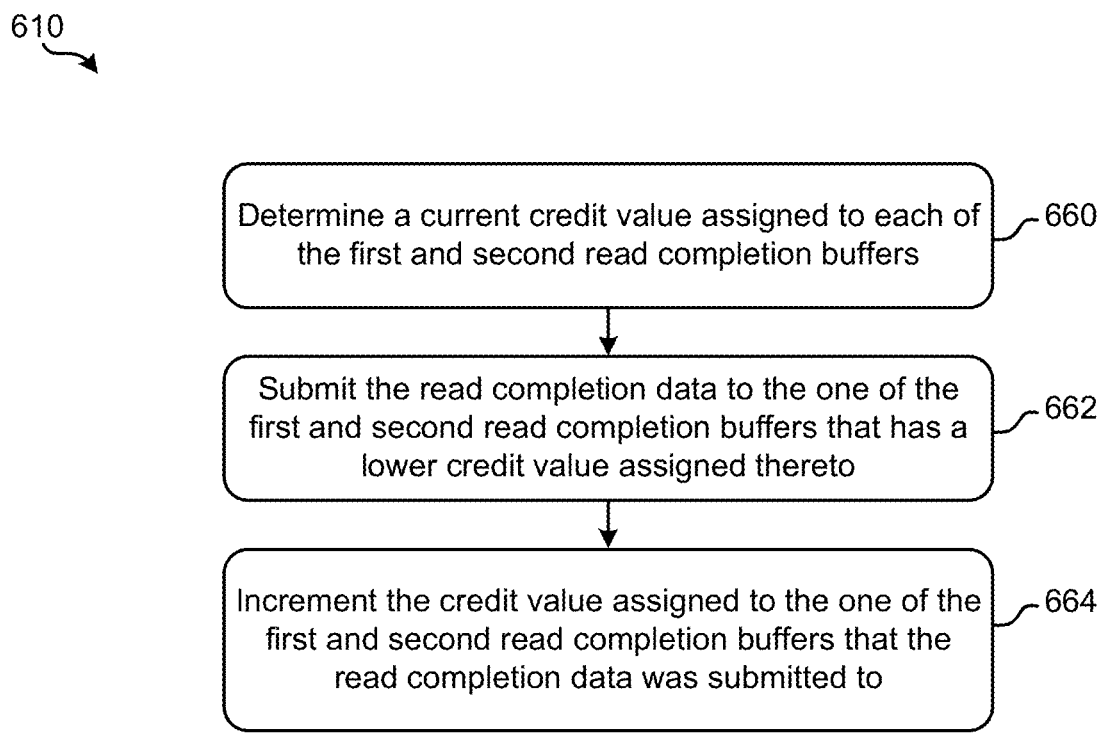
FIG. 6C is a flowchart of sub-processes for one of the operations in the method of FIG. 6A, in accordance with one embodiment.

For instance, referring momentarily now to FIG. 6C, exemplary sub-processes of allocating the read completion data between the first and second read completion buffers based on an amount of available space therein are illustrated in accordance with one embodiment. It follows that one or more of these sub-processes may be used to perform operation 610 of FIG. 6A. However, it should be noted that the sub-processes of FIG. 6C are illustrated in accordance with one embodiment which is in no way intended to limit the invention.

As shown, sub-operation 660 includes determining a current credit value assigned to each of the first and second read completion buffers. As noted above, in some approaches the relative buffer fill levels may be represented by a credit system, where a credit value corresponds to the amount of available space in the respective read completion buffer. Thus, by determining the current credit value assigned to each of the first and second read completion buffers, any difference in the amount of read completion data in the different buffers may be identified and accounted for. It should also be noted that each of the credit values may actually correspond to one of the computer interface links rather than the read completion buffers in some approaches.

The credit values may thereby be used to actually place read requests in each of the corresponding read completion buffers. Accordingly, sub-operation 662 includes submitting the read completion data to the one of the first and second read completion buffers that has a lower credit value assigned thereto. Sub-operation 664 further includes incrementing the credit value assigned to the one of the first and second read completion buffers that the read completion data was submitted to. As a result, the credit values are updated and accurately reflect the current fill levels of the read completion buffers.

The credit values associated with each of the read completion buffers may also be decremented in some situations. For instance, the credit value associated with a given read completion buffer and/or computer interface link may be decremented in response to sending a packet of read completion data to a source of the corresponding read request. In other words, a credit value may be decremented each time a previously received read request is satisfied and the read completion data is sent from the corresponding buffer, thereby increasing the amount of available space therein.

Failure events experienced at the buffers may also cause the corresponding credit values to be decremented. In some approaches, the credit value assigned to one of the read completion buffers is decremented in response to experiencing a failure event at the respective one of the read completion buffers. In still other approaches, a credit value may only be decremented if the failure event is experienced while read completion data is currently in the buffer. In other words, the credit value assigned to one of the read completion buffers may be decremented in response to experiencing a failure event at the read completion buffer before the read completion data therein can be sent in response to the initial request.

Referring back once again to FIG. 6A, read completion data that has accumulated in the read completion buffers is preferably sent (e.g., returned) to a source of the read requests that were initially received in order to actually satisfy the requests. Accordingly, operation 612 includes causing the read completion data in the first and second read completion buffers to be sent. Again, it is typically preferred that the read completion data is returned to the source of the initial read request, but in some approaches the read completion data may be sent to a predetermined location.

Moreover, the read completion data may be sent along more than one different computer interface link. As noted above, by increasing the number of computer interface links that connect two different locations in a system, the amount of information (e.g., requests, data, commands, etc.) that may be sent between the locations simultaneously and in parallel increases significantly. According to an exemplary approach, which is in no way intended to limit the invention, the read requests are received along two different PCIe links, and the read completion data is returned along the two PCIe links as well.

It follows that the read completion data is preferably sent from both read completion buffers along the computer interface links in parallel and simultaneously. As a result, operation 612 may involve causing the read completion data in the first read completion buffer to be sent to a source of the read requests via the first computer interface link concurrently with sending the read completion data in the second read completion buffer to the source of the read requests via the second computer interface link.

Again, these PCIe links may each correspond to one of the read request buffers and read completion buffers. In other words, a first read request buffer and first read completion buffer may correspond to a first PCIe link, while a second read request buffer and second read completion buffer correspond to a second PCIe link. Although a first read request buffer and first read completion buffer may correspond to a first PCIe link, while a second read request buffer and second read completion buffer correspond to a second PCIe link, it should also be noted that this association does not inhibit the flow of information across the links. In other words, although first read request buffer and first read completion buffer may correspond to a first PCIe link, while second read request buffer and second read completion buffer correspond to a second PCIe link, read requests received along one of the PCIe links is not restricted to being added to the corresponding read request buffer. Similarly, read completion data stored a specific one of the read completion buffers is not restricted to being returned along the corresponding PCIe link. Again, the relative fill levels of the buffers in each pair ultimately affects performance of the system. This variation in terms of which requests and/or read completion data is sent along which computer interface link may be accounted for by the previously mentioned indicators. Again, by keeping an indication of which computer interface link each read request was received along, as well as the corresponding read completion data, the process of returning data in response to the requests is improved.

It follows that various ones of the approaches included herein are desirably able to improve system performance by increasing read bandwidth. These improvements are achieved, at least in part, by interleaving received read commands between more than one read request buffer. Moreover, by monitoring and adhering to a credit monitoring system that organizes the return of requested data, read throughput may further be increased.

These efforts desirably maintain an adequately distributed supply of read requests and read completion data that can be used to fully utilize the bandwidth capabilities of the system. For instance, multiple computer interface links may be used to transfer requests, read completion data, etc. simultaneously and in parallel without experiencing system downtime caused by uneven flows.

Additionally, by implementing different hardware buffers for the read requests, and similarly for the read completion data, allows for selective ones of the requests and/or completion data in the respective buffers to be processed.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Figure 7:
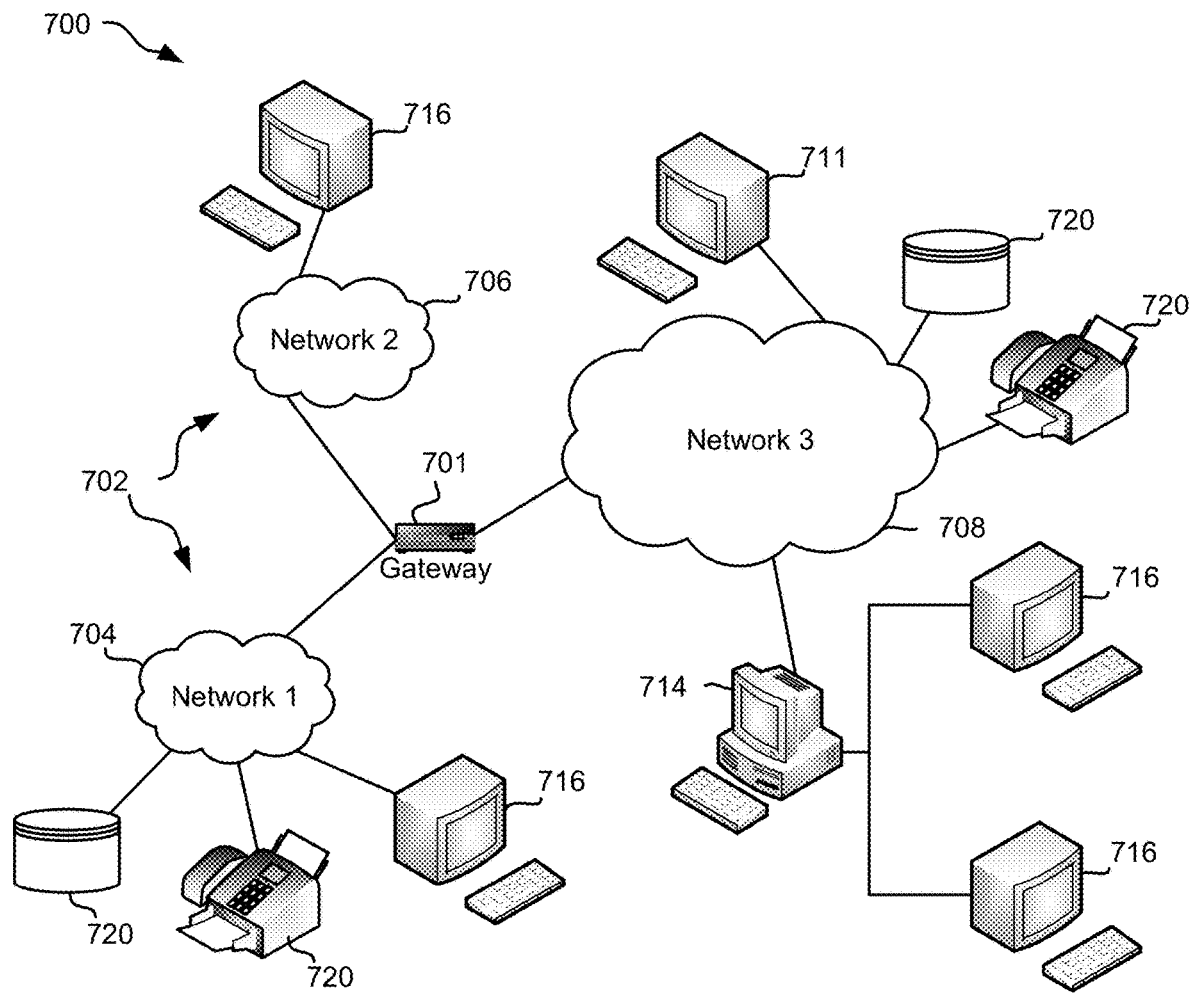
FIG. 7 is a network architecture, in accordance with one embodiment.

FIG. 7 illustrates a network architecture 700, in accordance with one embodiment. As shown in FIG. 7, a plurality of remote networks 702 are provided including a first remote network 704 and a second remote network 706. A gateway 701 may be coupled between the remote networks 702 and a proximate network 708. In the context of the present network architecture 700, the networks 704, 706 may each take any form including, but not limited to a LAN, a WAN such as the Internet, public switched telephone network (PSTN), internal telephone network, etc.

In use, the gateway 701 serves as an entrance point from the remote networks 702 to the proximate network 708. As such, the gateway 701 may function as a router, which is capable of directing a given packet of data that arrives at the gateway 701, and a switch, which furnishes the actual path in and out of the gateway 701 for a given packet.

Further included is at least one data server 714 coupled to the proximate network 708, and which is accessible from the remote networks 702 via the gateway 701. It should be noted that the data server(s) 714 may include any type of computing device/groupware. Coupled to each data server 714 is a plurality of user devices 716. Such user devices 716 may include a desktop computer, laptop computer, handheld computer, printer, and/or any other type of logic-containing device. It should be noted that a user device 711 may also be directly coupled to any of the networks, in some embodiments.

A peripheral 720 or series of peripherals 720, e.g., facsimile machines, printers, scanners, hard disk drives, networked and/or local data storage units or systems, etc., may be coupled to one or more of the networks 704, 706, 708. It should be noted that databases and/or additional components may be utilized with, or integrated into, any type of network element coupled to the networks 704, 706, 708. In the context of the present description, a network element may refer to any component of a network.

According to some embodiments, methods and systems described herein may be implemented with and/or on virtual systems and/or systems which emulate one or more other systems, such as a UNIX® system which virtually hosts an operating system environment, etc. This virtualization and/or emulation may be enhanced through the use of VMware® software, in some embodiments.

In other embodiments, one or more networks 704, 706, 708, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 8:
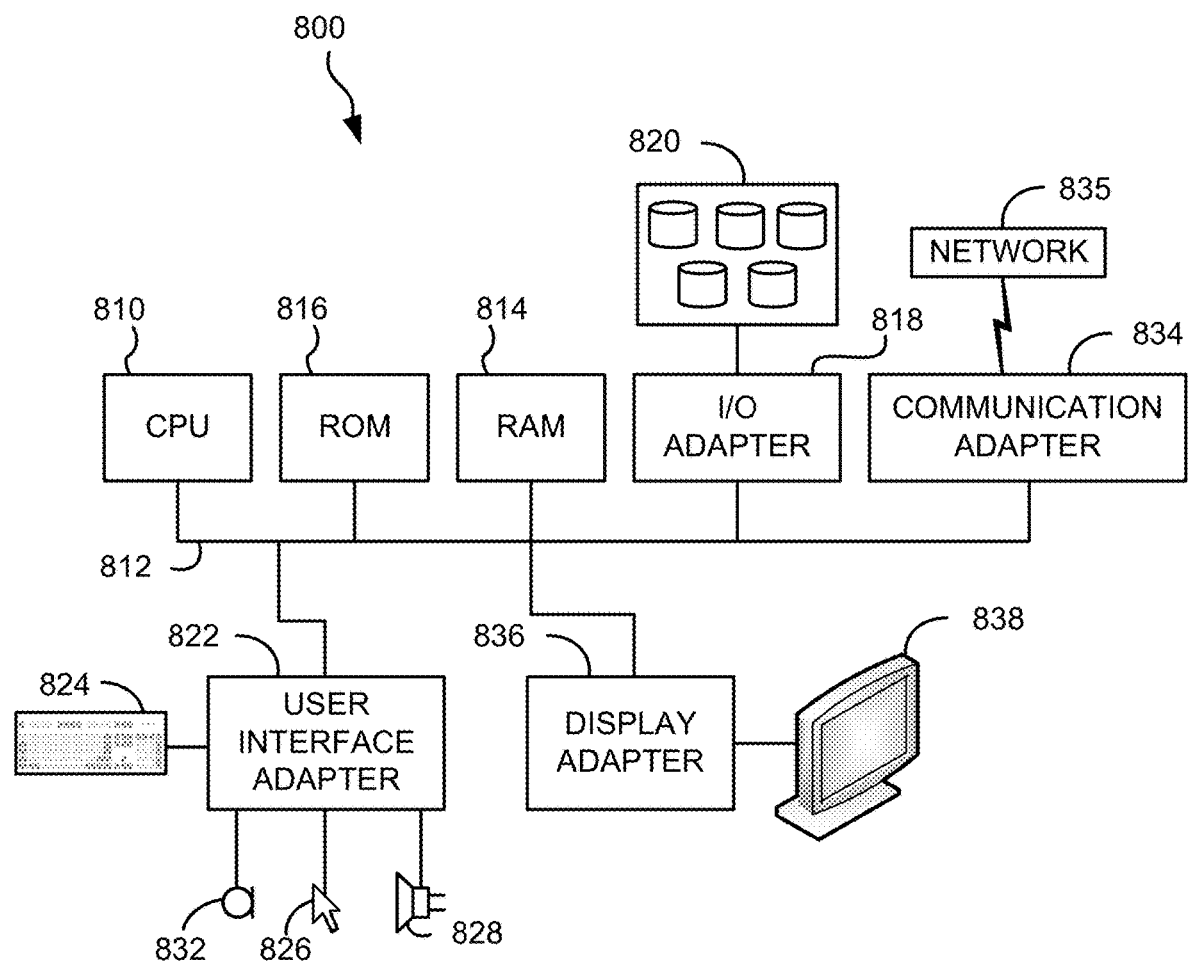
FIG. 8 is a representative hardware environment that may be associated with the servers and/or clients of FIG. 7, in accordance with one embodiment.

FIG. 8 shows a representative hardware environment associated with a user device 716 and/or server 714 of FIG. 7, in accordance with one embodiment. FIG. 8 illustrates a typical hardware configuration of a processor system 800 having a central processing unit 810, such as a microprocessor, and a number of other units interconnected via a system bus 812, according to one embodiment. In some embodiments, central processing unit 810 may include any of the approaches described above with reference to the one or more processors 210 of FIG. 2.

The processor system 800 shown in FIG. 8 includes a Random Access Memory (RAM) 814, Read Only Memory (ROM) 816, and an I/O adapter 818. According to some embodiments, which are in no way intended to limit the invention, I/O adapter 818 may include any of the approaches described above with reference to I/O adapter 218 of FIG. 2. Referring still to processor system 800 of FIG. 8, the aforementioned components 814, 816, 818 may be used for connecting peripheral devices such as storage subsystem 820 to the bus 812. In some embodiments, storage subsystem 820 may include a similar and/or the same configuration as data storage system 220 of FIG. 2. According to an example, which is in no way intended to limit the invention, storage subsystem 820 may include non-volatile data storage cards, e.g., having NVRAM memory cards, RAM, ROM, and/or some other known type of non-volatile memory, in addition to RAID controllers as illustrated in FIG. 2.

With continued reference to FIG. 8, a user interface adapter 822 for connecting a keyboard 824, a mouse 826, a speaker 828, a microphone 832, and/or other user interface devices such as a touch screen, a digital camera (not shown), etc., to the bus 812.

Processor system 800 further includes a communication adapter 834 which connects the processor system 800 to a communication network 835 (e.g., a data processing network) and a display adapter 836 which connects the bus 812 to a display device 838.

The processor system 800 may have resident thereon an operating system of any known type. It will be appreciated that a preferred embodiment may also be implemented on platforms and operating systems other than those mentioned. A preferred embodiment may be written using Java®, XML, C, and/or C++ language, or other programming languages, along with an object oriented programming methodology. Object oriented programming (OOP), which has become increasingly used to develop complex applications, may be used.

Figure 9:
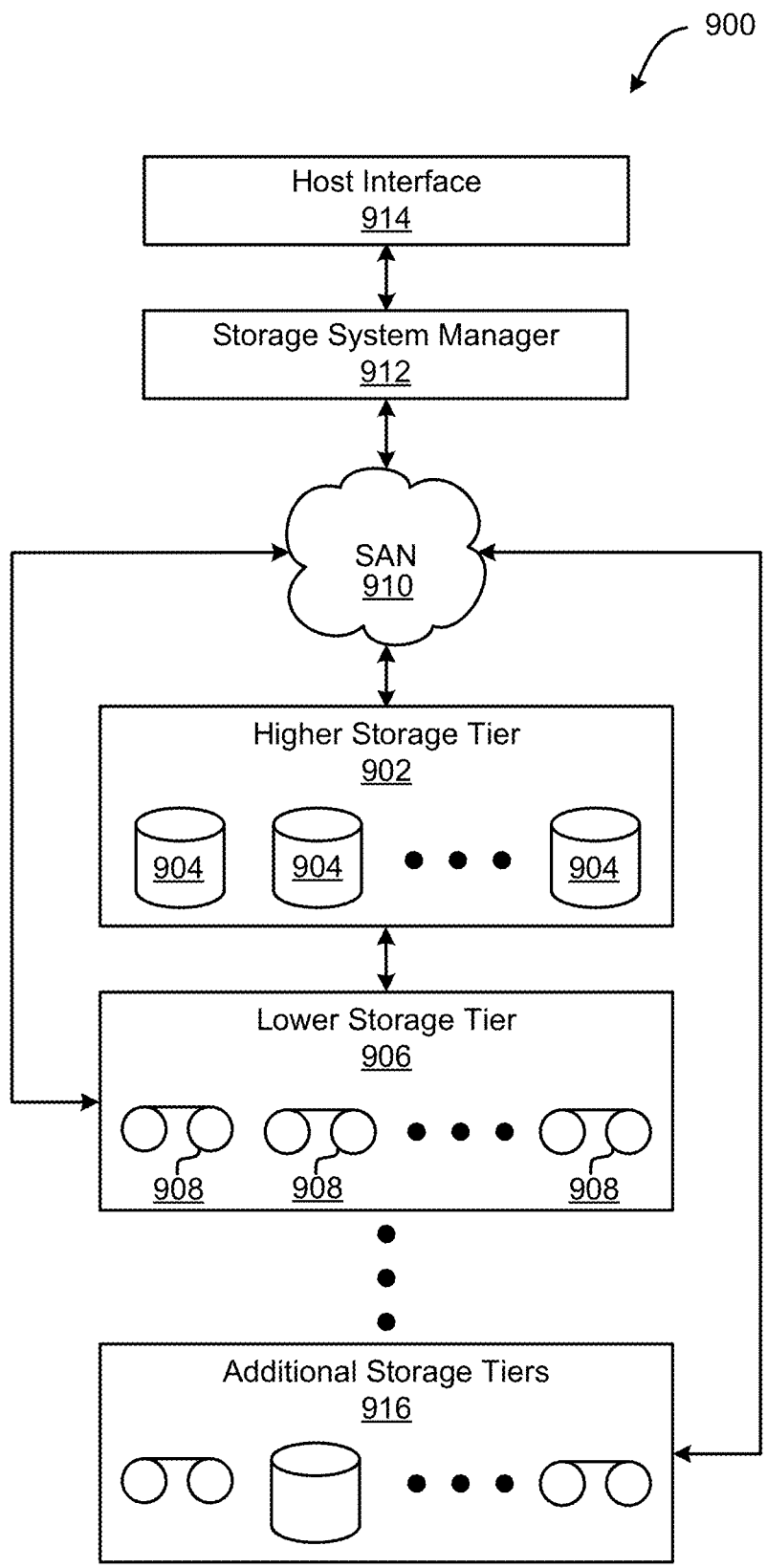
FIG. 9 is a diagram of a tiered data storage system in accordance with one embodiment.

Moreover, FIG. 9 illustrates a storage system 900 which implements high level (e.g., SSD) storage tiers in combination with lower level (e.g., magnetic tape) storage tiers, according to one embodiment. Note that some of the elements shown in FIG. 9 may be implemented as hardware and/or software, according to various embodiments. The storage system 900 may include a storage system manager 912 for communicating with a plurality of media on at least one higher storage tier 902 and at least one lower storage tier 906. However, in other approaches, a storage system manager 912 may communicate with a plurality of media on at least one higher storage tier 902, but no lower storage tier. The higher storage tier(s) 902 preferably may include one or more random access and/or direct access media 904, such as hard disks, nonvolatile memory (NVM), NVRAM), solid state memory in SSDs, flash memory, SSD arrays, flash memory arrays, etc., and/or others noted herein or known in the art. According to illustrative examples, FIGS. 3-4 show exemplary architectures of SSD systems which may be used as a higher storage tier 902 depending on the desired embodiment.

Referring still to FIG. 9, the lower storage tier(s) 906 preferably includes one or more lower performing storage media 908, including sequential access media such as magnetic tape in tape drives and/or optical media, slower accessing HDDs, slower accessing SSDs, etc., and/or others noted herein or known in the art. One or more additional storage tiers 916 may include any combination of storage memory media as desired by a designer of the system 900. Thus the one or more additional storage tiers 916 may, in some approaches, include a SSD system architecture similar or the same as those illustrated in FIGS. 1-2. Also, any of the higher storage tiers 902 and/or the lower storage tiers 906 may include any combination of storage devices and/or storage media.

The storage system manager 912 may communicate with the storage media 904, 908 on the higher storage tier(s) 902 and lower storage tier(s) 906 through a network 910, such as a storage area network (SAN), as shown in FIG. 9, or some other suitable network type. The storage system manager 912 may also communicate with one or more host systems (not shown) through a host interface 914, which may or may not be a part of the storage system manager 912. The storage system manager 912 and/or any other component of the storage system 900 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 900 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or any combination of media storage types. In one such configuration, a higher storage tier 902, may include a majority of SSD storage media for storing data in a higher performing storage environment, and remaining storage tiers, including lower storage tier 906 and additional storage tiers 916 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 902, while data not having one of these attributes may be stored to the additional storage tiers 916, including lower storage tier 906. Of course, one of skill in the art, upon reading the present descriptions, may devise many other combinations of storage media types to implement into different storage schemes, according to the embodiments presented herein.

According to some embodiments, the storage system (such as 900) may include logic configured to receive a request to open a data set, logic configured to determine if the requested data set is stored to a lower storage tier 906 of a tiered data storage system 900 in multiple associated portions, logic configured to move each associated portion of the requested data set to a higher storage tier 902 of the tiered data storage system 900, and logic configured to assemble the requested data set on the higher storage tier 902 of the tiered data storage system 900 from the associated portions.

Of course, this logic may be implemented as a method on any device and/or system or as a computer program product, according to various embodiments.

What is claimed is:

1. A computer-implemented method, comprising:
receiving, in a first read request buffer of a solid state drive and in a second read request buffer of the solid state drive, read requests,
wherein the first read request buffer of the solid state drive corresponds to a first computer interface link,
wherein the second read request buffer of the solid state drive corresponds to a second computer interface link;
receiving read completion data corresponding to the read requests being performed;
allocating the read completion data between a first read completion buffer of the solid state drive and a second read completion buffer of the solid state drive based on which of the read completion buffers has a greater amount of available space therein, wherein the first read completion buffer corresponds to the first computer interface link and the second read completion buffer corresponds to the second computer interface link; and causing the read completion data in the first and second read completion buffers to be sent from the solid state drive.

2. The computer-implemented method of claim 1, wherein allocating the read completion data between the first and second read completion buffers based on which of the read completion buffers has a greater amount of available space therein includes:

determining a credit value assigned to each of the read completion buffers, wherein the credit value corresponds to the amount of available space in the respective read completion buffer;

submitting the read completion data to the read completion buffer that has a lower credit value assigned thereto; and incrementing the credit value assigned to the read completion buffer that the read completion data was submitted to.

3. The computer-implemented method of claim 2, comprising:

in response to experiencing a failure event at one of the read completion buffers, decrementing the credit value assigned to the read completion buffer having the failure event.

4. The computer-implemented method of claim 1, comprising:

causing a newer read request in the first read request buffer to be performed while an older read request in the second read request buffer remains outstanding.

5. The computer-implemented method of claim 1, wherein causing the read completion data in the first and second read completion buffers to be sent includes:

causing the read completion data in the first read completion buffer to be sent to a source of the read requests via the first computer interface link concurrently with sending the read completion data in the second read completion buffer to the source of the read requests via the second computer interface link.

6. The computer-implemented method of claim 1, wherein the read requests are received via the first and second computer interface links in an alternating pattern.

7. The computer-implemented method of claim 1, wherein the first and second computer interface links are connected to the solid state drive, wherein the first and second computer interface links are also connected to a controller of a data storage system, wherein the data storage system is connected to a host via a network, and comprising sending the read completion data in the first and second read completion buffers to the controller, wherein the controller causes the read completion data to be sent to the host via the network.

8. A computer program product, comprising:

one or more computer readable storage media, and program instructions collectively stored on the one or more computer readable storage media, the program instructions comprising:

program instructions to receive, in a first read request buffer of a solid state drive and in a second read request buffer of the solid state drive, read requests;

wherein the first read request buffer of the solid state drive corresponds to a first computer interface link, wherein the second read request buffer of the solid state drive corresponds to a second computer interface link;

program instructions to receive read completion data corresponding to one or more of the read requests being performed;

program instructions to allocate the read completion data between a first read completion buffer and a second read completion buffer based on which of the read completion buffers has a greater amount of available space therein, wherein the first read completion buffer corresponds to the first computer interface link and the second read completion buffer corresponds to the second computer interface link; and program instructions to cause the read completion data in the first and second read completion buffers to be sent from the solid state drive.

9. The computer program product of claim 8, wherein allocating the read completion data between the first and second read completion buffers based on which of the read completion buffers has a greater amount of available space therein includes:

determining a credit value assigned to each of the read completion buffers, wherein the credit value corresponds to the amount of available space in the respective read completion buffer;

submitting the read completion data to the read completion buffer that has a lower credit value assigned thereto; and incrementing the credit value assigned to the read completion buffer that the read completion data was submitted to.

10. The computer program product of claim 9, the program instructions comprising:

in response to experiencing a failure event at one of the read completion buffers, program instructions to decrement the credit value assigned to the read completion buffer having the failure event.

11. The computer program product of claim 8, the program instructions comprising:

program instructions to cause a newer read request in the first read request buffer to be performed while an older read request in the second read request buffer remains outstanding.

12. The computer program product of claim 8, wherein each of the received read requests indicate an amount of the read completion data that corresponds to satisfying the respective read request.

13. The computer program product of claim 8, wherein causing the read completion data in the first and second read completion buffers to be sent includes:

causing the read completion data in the first read completion buffer to be sent to a source of the read requests via the first computer interface link concurrently with sending the read completion data in the second read completion buffer to the source of the read requests via the second computer interface link.

14. The computer program product of claim 8, wherein the received read requests received via the first and second computer interface links in an alternating pattern.

15. A solid state drive, comprising:

a plurality of non-volatile random access memory (NVRAM) blocks configured to store data in the solid state drive;

a first read request buffer of the solid state drive corresponding to a first computer interface link, a second read request buffer of the solid state drive corresponding to a second computer interface link;

a first read completion buffer of the solid state drive;

a second read completion buffer of the solid state drive; and logic configured to:

receive read requests in the first and second read request buffers;

receive read completion data corresponding to one or more of the read requests being performed;

allocate the read completion data between the first and second read completion buffers based on which of the read completion buffers has a greater amount of available space therein, wherein the first read completion buffer corresponds to the first computer interface link and the second read completion buffer corresponds to the second computer interface link; and cause the read completion data in the first and second read completion buffers to be sent from the solid state drive.

16. The solid state drive of claim 15, wherein allocating the read completion data between the first and second read completion buffers based on which of the read completion buffers has a greater amount of available space therein includes:

determining a credit value assigned to each of the read completion buffers, wherein the credit value corresponds to the amount of available space in the respective read completion buffer;

submitting the read completion data to the read completion buffer that has a lower credit value assigned thereto; and incrementing the credit value assigned to the read completion buffer that the read completion data was submitted to.

17. The solid state drive of claim 16, wherein the logic is configured to:

in response to experiencing a failure event at one of the read completion buffers, decrement the credit value assigned to the read completion buffer having the failure event.

18. The solid state drive of claim 15, wherein the logic is configured to:

cause a newer read request in the first read request buffer to be performed while an older read request in the second read request buffer remains outstanding.

19. The solid state drive of claim 15, wherein causing the read completion data in the first and second read completion buffers to be sent includes:

causing the read completion data in the first read completion buffer to be sent to a source of the read requests via the first computer interface link concurrently with sending the read completion data in the second read completion buffer to the source of the read requests via the second computer interface link.

20. The solid state drive of claim 15, comprising a compressor configured to compress the read completion data prior to the read completion data being stored in the read completion buffers.

* * * * *